UNITED STATES PATENT OFFICE.

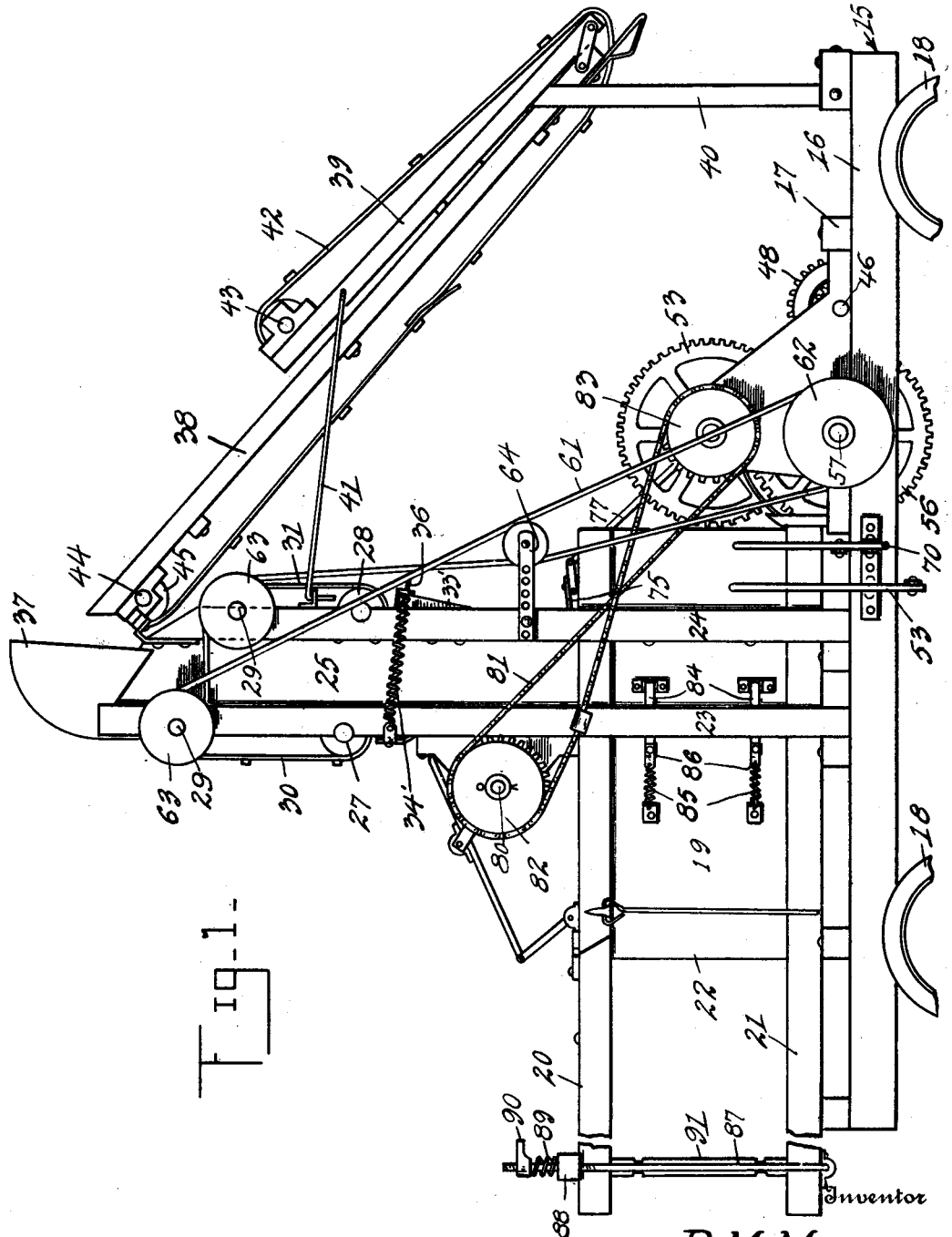

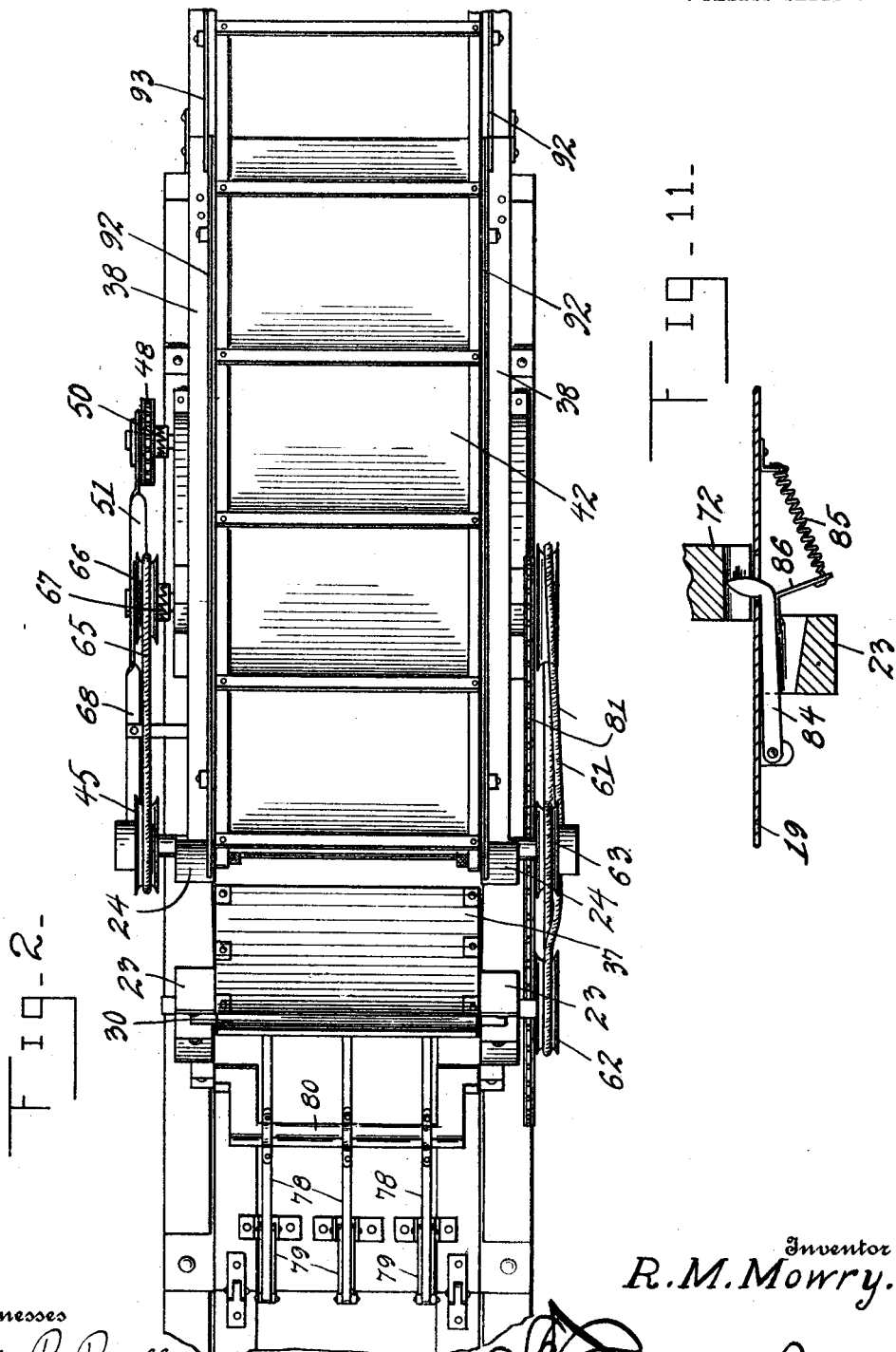

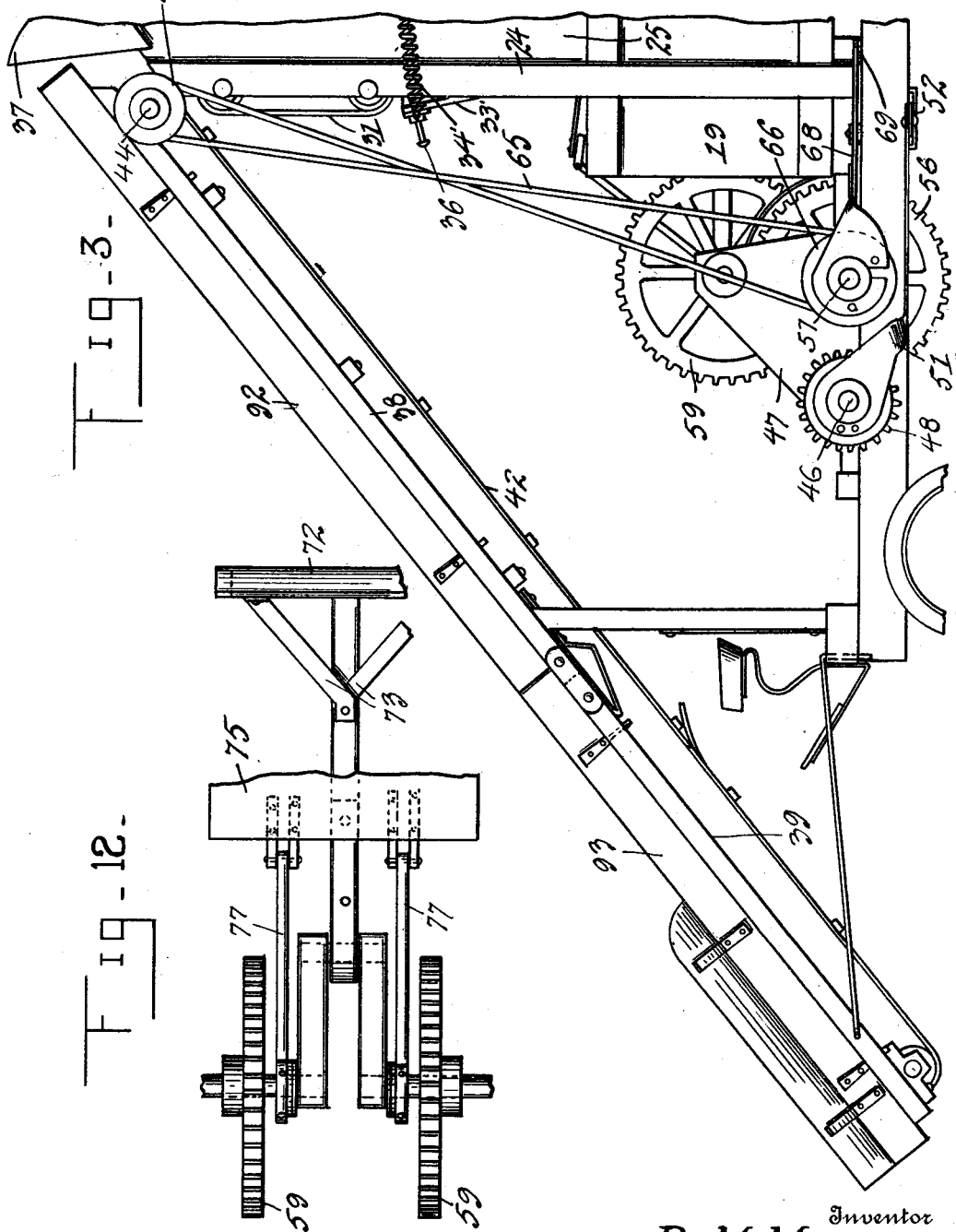

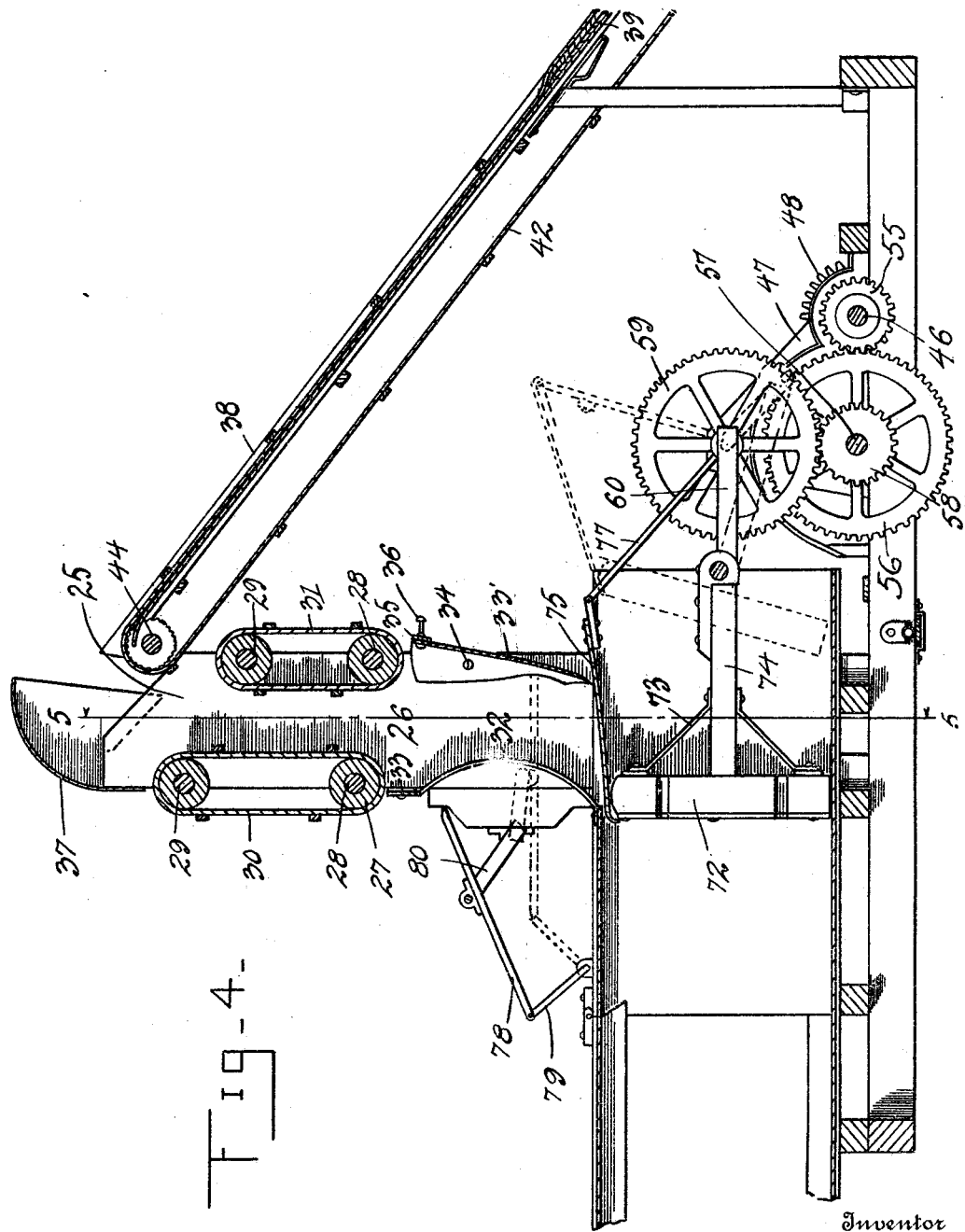

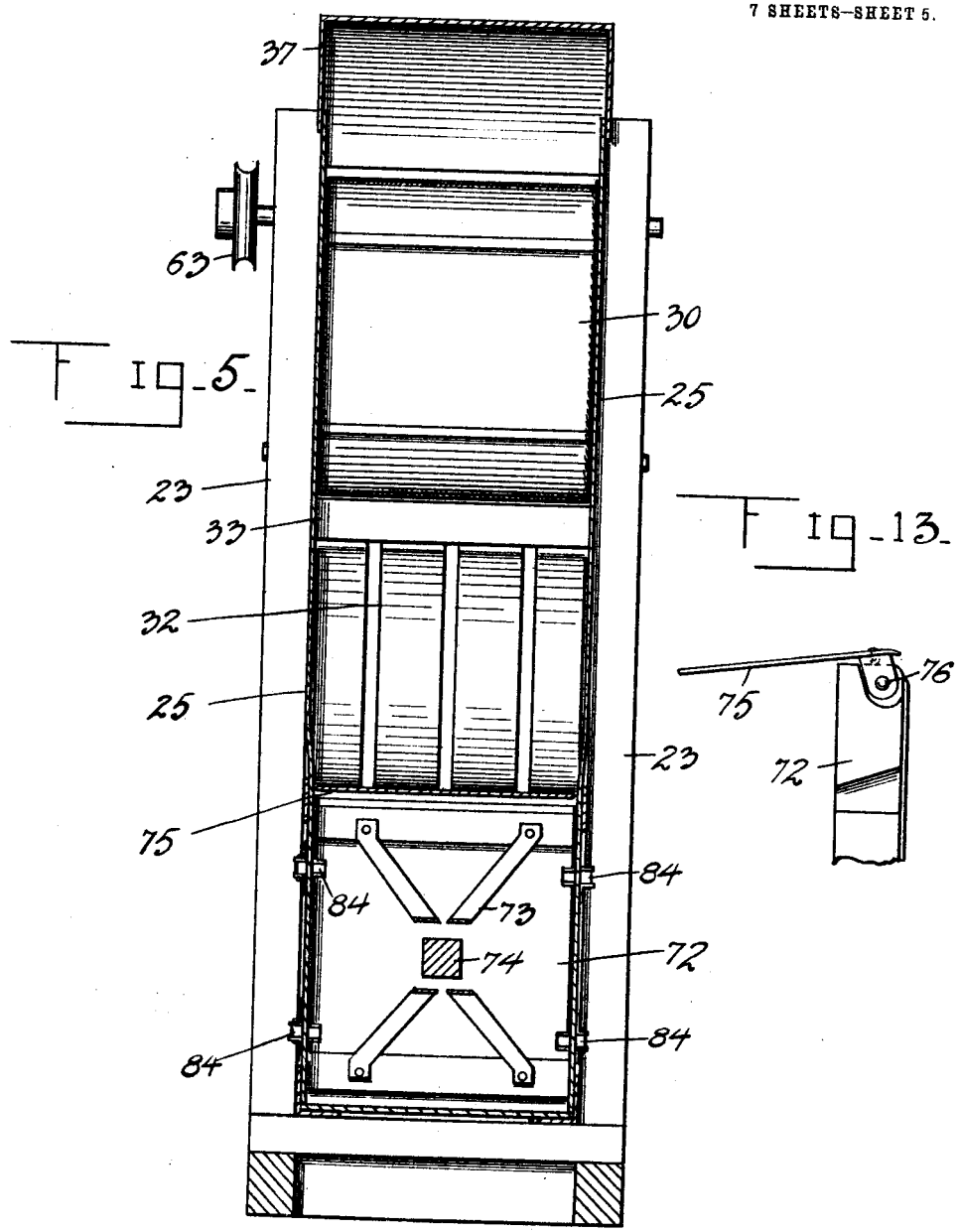

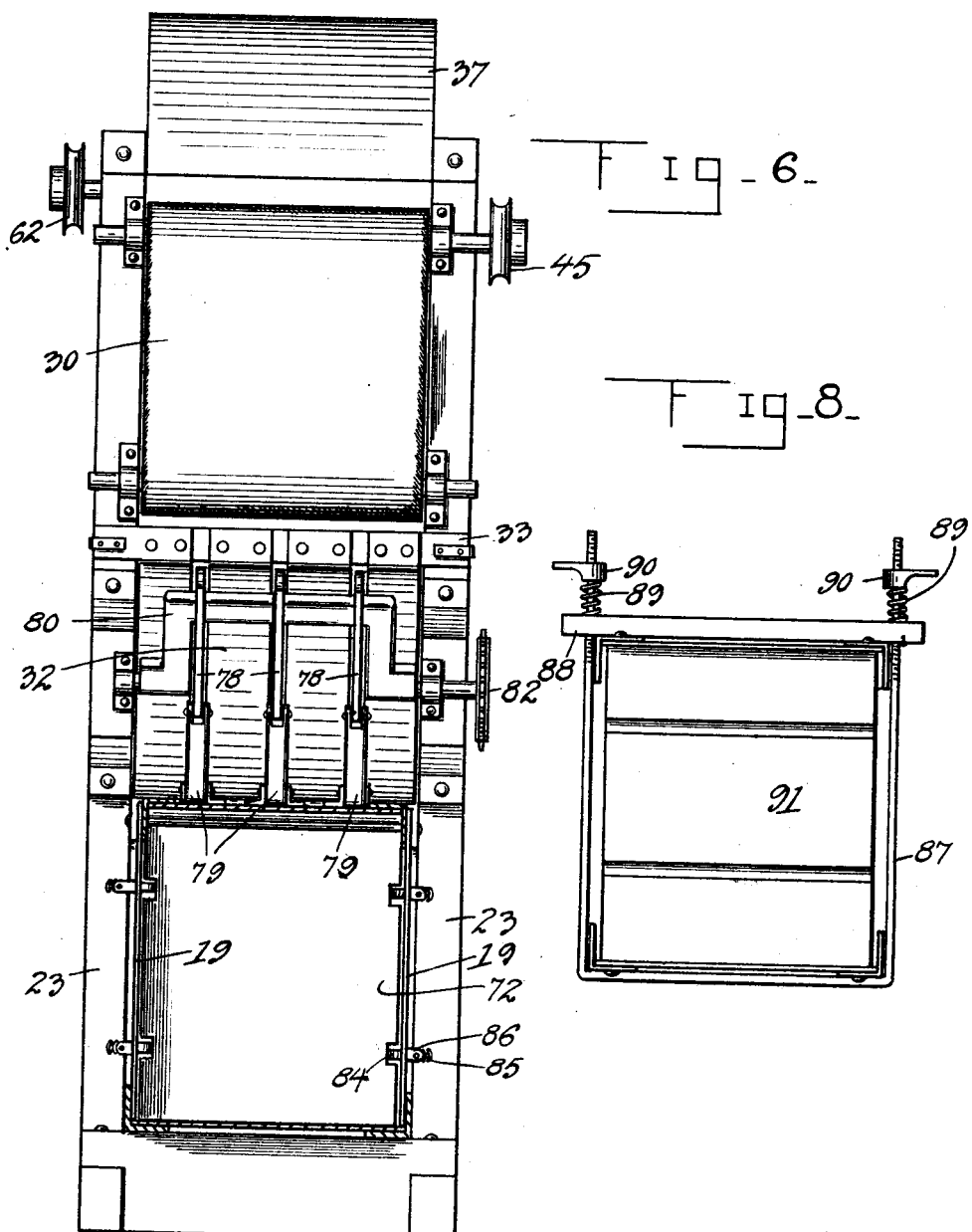

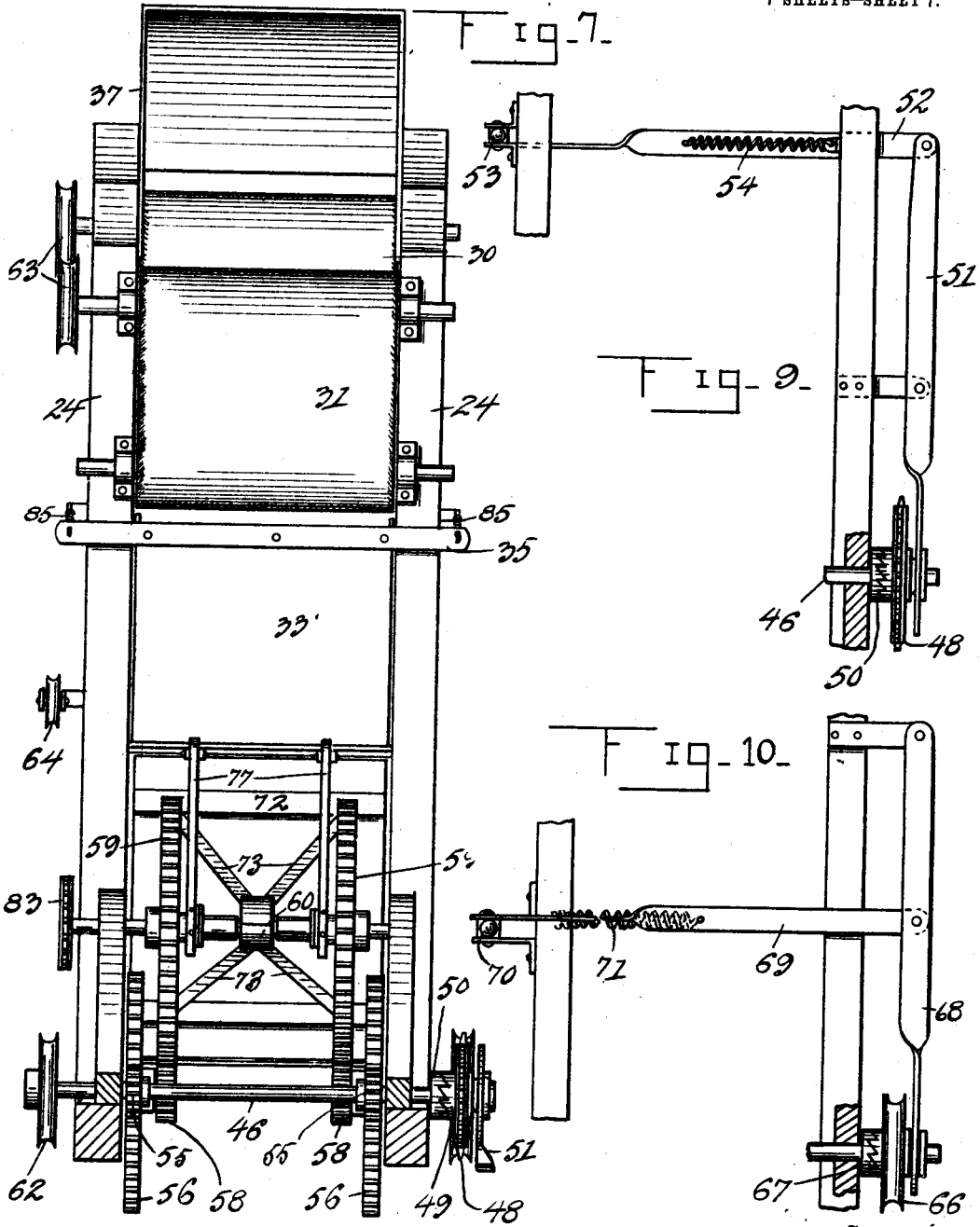

ROY M. MOWRY, OF LOS ANGELES, CALIFORNIA, ASSIGNOR OF ONE-HALF TO CHARLES A. MARKWELL, OF LOS ANGELES, CALIFORNIA.

BALING-MACHINE.

1,076,601.  Specification of Letters Patent.  Patented Oct. 21, 1913.

Application filed February 21, 1913. Serial No. 749,937.

*To all whom it may concern:*

Be it known that I, ROY M. MOWRY, a citizen of the United States, residing at Los Angeles, in the county of Los Angeles and State of California, have invented certain new and useful Improvements in Baling-Machines; and I do hereby declare the following to be a full, clear, and exact description of the invention, such as will enable others skilled in the art to which it appertains to make and use the same.

This invention comprehends improvements in baling machines and relates more particularly to those which are especially adapted for baling such materials as hay and straw, and which may be connected directly to a threshing machine.

The primary object of the invention resides in the provision of a baling machine of this nature, which shall be automatic in operation, very efficient, and which may be connected directly to a threshing machine to receive the material from the blower stacking pipe and equally distribute the straw and chaff in each bale.

Another and more specific object of the invention resides in the provision of a machine of this nature, which shall be equipped with novel means for feeding and packing the material into the baling chamber.

The invention also aims to generally improve devices of this nature, to render them more compact in structure, more mechanically perfect in operation, and more commercially desirable.

With these and other objects in view, as will become more apparent as the description proceeds, the invention consists in certain novel features of construction, combination, and arrangement of parts, as will be hereinafter described and claimed.

For a complete understanding of my invention, reference is to be had to the following description and accompanying drawings, in which, Figure 1 is a side elevation of a baling machine constructed in accordance with my invention, Fig. 2 is a fragmentary top plan view of said machine, Fig. 3 is a fragmentary side elevation of the rear end of my improved baling machine, Fig. 4 is a longitudinal vertical sectional view through the central portion of said machine, Fig. 5 is a section taken on the plane of line 5—5 of Fig. 4, Fig. 6 is a front elevation partly in section, Fig. 7 is a rear elevation, Fig. 8 is a detail view of the tensioning device, Figs. 9 and 10 are detail top plan views of the main clutch and endless carrier clutch, respectively, Fig. 11 is a detail view of a dog, Fig. 12 is a detail top plan view, showing the connection of the plunger with the crank shaft and the braces for the retaining plate, and, Fig. 13 is a detail view, showing the connection between the plunger and said retaining plate.

In the following description and accompanying drawings, similar parts will be referred to and designated by like reference characters.

Referring in detail to the drawings by numerals, 15 designates, generally, a truck having the longitudinal side bars 16 and cross bars 17, said truck being suitably supported upon wheels 18.

19 designates, generally, the body of my baling machine, said body comprising top and bottom walls 20 and 21, respectively, and side walls 22. The side walls 22 extend rearwardly beyond the top wall 20 and form in conjunction with said top wall and the bottom wall 21, a baling chamber.

A pair of uprights 23 and 24 extend upwardly from each of the side bars of the truck on opposite sides of the baling chamber and serve to reinforce the same. Plates 25 are secured to the uprights of each pair and form the sides of a hopper 26, said hopper discharging into the baling chamber. Rollers 27 are rigid with shafts 28 and 29 and support endless aprons or drapers 30 and 31, said drapers serving to partly close the front and rear sides of the hopper 26. A plurality of arched strips 32 are secured at their upper ends in spaced relationship to a transverse bar 33 and at their lower ends to the top wall 20 of the baling chamber adjacent its rear end. A tension feed plate 33' is pivotally secured intermediate its ends by means of suitable fasteners 34 to the uprights 24. A contractile spiral spring 34' is connected to each extremity of a transverse bar 35 which extends across the top of the feed tension plate 33', and to the uprights 23. Adjusting screws 36 are threaded through the transverse bar 35 into engagement with the rear faces of the uprights 24, and are for the purpose of adjusting the width of the passage through the hopper 26. A hood 37 is secured to the uprights 23 and serves to direct the material into said hopper.

A hinged carrier comprising the upper section 38 and a lower section 39, is removably secured to the uprights 24. Braces 40 support the lower end of the section 38 and hooks 41 support the lower section when the carrier is in its operative position and hold said section in contact with the upper section when the carrier is folded. A slatted conveyer 42 runs over rollers rigid with the shafts 43 and 44. The upper shaft carries a pulley 45 which is adapted to be driven in a manner to be hereinafter described.

A main drive shaft 46 is journaled transversely of the machine through angular bearing plates 47 carried upon the side bars of the truck. A sprocket wheel 48 having a clutch member 49 formed on its inner face, is slidably mounted upon the shaft 46 and may be moved to engage the clutch member 49 with the clutch member 50. Power may be imparted to the sprocket wheel through any suitable means. The clutch members 49 and 50 may be thrown out of engagement by means of the levers 51, 52 and 53. A spring 54 tends to hold the clutch members normally in engagement with each other.

Pinions 55 are rigid with the main drive shaft 46 and mesh with large gears 56 carried upon the counter shaft 57, said shaft being also journaled through the bearing plates 47. Pinions 58 are rigid with the counter shaft 57 and mesh with the large gears 59, which latter are secured to a crank shaft 60.

An endless belt 61 is driven by a pulley 62 upon the end of the counter shaft 57 and in turn drives the pulleys 63 which are secured to the roller supporting shafts 29. A belt tightener 64 is secured to the upright 24 for use in connection with the belt 61. An endless belt 65 is driven by the pulley 66 which is rigid upon the other end of the counter shaft and drives the pulley 45, whereby the slatted conveyer is actuated.

The pulley 66 carries a clutch member for engagement with the clutch member 67 and may be disconnected therefrom by means of the levers 68, 69 and 70. A spring 71 tends to hold the clutch members normally in engagement with each other.

A plunger 72 is adapted to be reciprocated within the baling chamber and has secured to its rear side, by means of suitable braces 73, a plunger rod 74, which is connected to the crank of the crank shaft 60. A retaining plate 75 is pivotally secured to the top of the plunger by means of suitable fasteners 76 and is supported at its rear end by means of the braces 77 which are pivotally connected thereto and to the alined portions of the crank shaft.

A plurality of packer and feeder arms 78 are pivotally connected at their rear ends to links 79 which latter are pivotally secured to the top wall of the baling chamber. These arms are secured intermediate their ends to a crank shaft 80 which is journaled transversely above the baling chamber and which is rotated by means of a sprocket chain 81 and sprocket wheels 82 and 83. The packer and feeder arms are adapted to project between the arched strips 32 into the hopper 26 and force the hay or straw downwardly into the baling chamber. A plurality of dogs 84 are pivotally secured to the sides of the baling chamber and extend into the same, as clearly shown in Fig. 11. Springs 85 are connected to the dogs by means of angular arms 86 and tend to hold the free ends of the same normally within said chamber. These dogs are for the purpose of preventing the hay or straw being drawn rearwardly with the plunger. A suitable tensioning device consisting of a yoke 87, cross bar 88, springs 89, and tension nuts 90, is connected to the forward end of the body.

91 designates a grooved division board, which is used in forming the bales. The division boards may be dropped into the baling chamber in front of the plunger when the latter is in its rearmost position, without the necessity of stopping the machine, and this I consider to be an important feature of my invention.

Referring to Figs. 1 and 4, it will be seen that as the main shaft 46 is driven in a counter clockwise direction, the crank shaft 60 is similarly rotated and will move the plunger from the forward position shown in full lines, to its rear position, shown by the dotted lines. As the plunger is moving rearwardly, the crank shaft 80 is being rotated in a clock-wise direction by means of the sprocket chain 81 and its coöperating parts, and carries the packer and feeder arms 78 rearwardly into the hopper 26 and downwardly. The operation of the plunger and packer and feeder arms is so timed as to cause the hay and straw to be properly forced into the baling chamber. The retaining plate 75 prevents any material dropping to the rear of the plunger.

If the hay or straw is being taken from a stack, wagon, or the like, the carrier is arranged as shown in Fig. 3, and the endless conveyer 42 passing thereover is driven simultaneously with the plunger and packer arms. Removable fenders 92 and 93 are adapted to be secured to the conveyer sections 38 and 39, respectively, and serve to prevent the hay or straw dropping from the latter. When the machine is being moved over the ground the fenders are removed and the carrier is folded as shown in Fig. 1. When the hopper is being fed directly from the blower stack pipe of the thresher, the entire carrier may be disconnected from said machine. The endless aprons 30 and 31 insure the hay and straw being moved downwardly into reach of the feeder and packer arms 78 and the tension plate 33' may be suitably adjusted to regulate the width of the passage through said hopper, as before stated.

From the foregoing description taken in connection with the accompanying drawings, it will be seen that I have constructed an improved baling machine which is automatic and efficient in operation, which may or may not be fed directly from a threshing machine, which may be partly or entirely thrown out of gearing by means of suitable clutches, and which is provided with a carrier which may be folded into a compact form to facilitate traveling.

It is to be understood that while I have shown and described the preferred embodiment of my invention, I do not wish to be limited to this exact construction, combination, and arrangement of parts, but may make such changes as will fall within the spirit and scope of the invention.

Having thus described my invention, what I claim is:—

1. In a baling machine, the combination with a body having a baling chamber formed at the end thereof; of a vertical hopper discharging into the top of said baling chamber; endless aprons forming a portion of the front and rear walls of said hopper; a spring tension plate forming a portion of the rear wall of said hopper; a plurality of spaced strips completing the front wall of said hopper; a plunger adapted to be reciprocated within said baling chamber; means working through said spaced strips for forcing material from the hopper into the path of the plunger; and means for driving said plunger, forcing means, and endless aprons.

2. In a baling machine, the combination with a body having a baling chamber formed at one end thereof; of a vertical hopper discharging into the top of said baling chamber; means forming a portion of the front and rear walls of said hopper for moving the material downwardly therethrough; a plurality of spaced strips completing the forward wall of said hopper; a plurality of packer arms; links pivotally connecting the forward ends of said arms to the body; a crank shaft to which said arms are connected intermediate their ends; a plunger adapted to be reciprocated within said baling chamber; and means for actuating said first mentioned means, the packer arms, and plunger; said packer arms working between the spaced strips and serving to force material from the hopper into the path of the plunger.

3. In a baling machine, the combination with a body having a baling chamber formed at one end thereof, of a hopper discharging into the top of said baling chamber, a plunger adapted to be reciprocated within said chamber, a crank shaft to which said plunger is connected, a rearwardly extending retaining plate pivotally secured to the top of said plunger, means secured to the alined portion of said crank shaft for supporting the rear end of the retaining plate, and means for operating said crank shaft, the retaining plate preventing material from being discharged from the hopper to the rear of the plunger.

4. A baling machine comprising in combination, a truck, a body mounted on said truck, a hopper discharging into said body, means for carrying material to the top of said hopper, means for carrying material downwardly through said hopper, a plunger adapted to be reciprocated within said baling chamber, a main drive shaft, a counter shaft geared to said first mentioned shaft, means driven by said counter shaft for actuating the first and second mentioned means, a crank shaft geared to said counter shaft, said plunger being connected to the crank shaft, packer arms adapted to force material from the hopper into said baling chamber, and means connected to the crank shaft for driving said arms.

In testimony whereof I affix my signature in presence of two witnesses.

ROY M. MOWRY.

Witnesses:
S. MARKWELL,
JAMES S. ROCHE.

---

Copies of this patent may be obtained for five cents each, by addressing the "Commissioner of Patents, Washington, D. C."